United States Patent

[11] 3,614,748

[72] Inventors William Peil
North Syracuse;
Richard J. Pepe, Liverpool, both of N.Y.
[21] Appl. No. 1,115
[22] Filed Jan. 7, 1970
[45] Patented Oct. 19, 1971
[73] Assignee General Electric Company

[54] HIGH-SPEED MEMORY AND MULTIPLE LEVEL LOGIC NETWORK WITH PULSE SHAPING
5 Claims, 2 Drawing Figs.

[52] U.S. Cl. ........ 340/173 R, 307/317
[51] Int. Cl. ........ G11c 11/36
[50] Field of Search ........ 340/173 R, 173 FF; 307/317

[56] References Cited

UNITED STATES PATENTS 3,332,067 7/1967 Bacon ........ 340/173

*Primary Examiner*—Terrell W. Fears
*Attorneys*—Marvin A. Goldenberg, Richard V. Lang, Frank L. Neuhauser, Oscar B. Waddell and Joseph B. Forman ABSTRACT: To substantially improve the operation of a high-speed, low-power digital logic network of the type including a bistable tunnel diode circuit, a source of clock signal pulses and a multiple input logic gate circuit for generating logic signal pulses in response to applied binary inputs and said clock signal pulses, said logic and clock signal pulses being coupled to said tunnel diode circuit for driving it into a first stable state when concurrently applied and into a second stable state with said clock signal pulses solely applied, the improvement comprising the employment of pulse-shaping circuit at the output of the clock signal source for shaping the clock signal pulses applied to said logic gate circuit so as to relax component tolerances and reduce spurious operation.

INVENTORS:
WILLIAM PEIL,
RICHARD J. PEPE,
BY Marvin Goldenberg
THEIR ATTORNEY.

HIGH-SPEED MEMORY AND MULTIPLE LEVEL LOGIC NETWORK WITH PULSE SHAPING

The invention herein described was made in the course of a contract or subcontract thereunder with the Department of the Army.

BACKGROUND OF THE INVENTION

1. Field of the Invention

The invention relates to the field of high-speed digital logic networks employing semiconductor devices and, more particularly, to networks of this type capable of performing multiple level logic operations with memory. 1. Description of the Prior Art There presently exist high-speed semiconductor logic networks of various forms including different transistor and tunnel diode logic gates for performing basic boolean logic operations. For performing complex logic functions a plurality of transistor logic gates may be interconnected with transistor flip-flop components or other conventional memory components, these networks providing the optimum speed-power product for operations at moderate speeds, for example, less than 10 MHz. operating frequency. However, power to perform the memory functions greatly increases at high speeds, for example, 50 MHz. and above, so as to make these networks much less suitable for high-speed operation. This is due partially to capacitive parasitics associated with transistor devices and partially to the finite gain-bandwidth product of transistors.

Although tunnel diode logic gates are inherently faster acting than transistors, for performing multiple level logic functions a sequential clocking must be employed with a clock signal applied at each level. Thus, the frequency at which a multiple level logic operation can be performed is $1/n$ the frequency of a single logic operation, where $n$ is the number of logic levels. Further, the power required is increased as a function of $n$.

Recently, a high-speed memory and multiple level logic network has been developed which combines transistor and tunnel diode logic components in a novel manner so as to exhibit the high-speed and low-power properties for which the tunnel diode has an inherent capability, and which is capable of performing multiple level logic operations with optimum speed-power products. This multiple level logic network is the subject of a copending application for U.S. Pat., Ser. No. 589,722, filed Oct. 26, 1966 by William Peil, and assigned to the assignee of the present invention. The logic network of the referred to application employs as a basic building block a plurality of transistor logic gates in combination with a tunnel diode circuit that performs both a logic and a memory function, wherein said transistor logic gates and tunnel diode circuit are operated in a single sequence responsive to a single clock signal. The transistor logic gates comprise at least one reference transistor integrally connected with the tunnel diode and at least one input transistor. The clock signal is coupled to said reference transistor for causing conduction thereof or not, as a function of digital inputs applied to the input transistor. Conduction of the reference transistor applies a signal pulse to the tunnel diode for switching it into a first stable state. The clock signal is further applied to said tunnel diode circuit for causing switching into a second stable state in the absence of the signal pulse from said reference transistor.

The described multiple level logic network, being a basic logic component, is normally employed in multiple form with similar networks coupled to the input and output. All networks may be operated by a synchronous clock. The clock signal is in the form of very high-frequency periodic pulses having narrow pulse widths with steep leading and lagging edges, in the order of several nanoseconds pulse widths and a frequency up to 100 MHz. and higher. Narrow width pulses, and in particular the steep leading edge of said pulses, are required in order to operate the network at a well-defined point in time, thereby performing an accurate logic operation with respect to existing inputs and avoiding the occurrence of a race condition. A race condition exists where a given network falsely responds to inputs that are changing during the application of the clock pulse. In the prior art network of the referred to copending application, Ser. No. 589,722, it was found that unless circuit component tolerances were tightly controlled, the narrow width pulses tended to produce spurious responses in the reference transistors. In addition, the hysteresis of threshold for the logic network, which is the range of input voltages between specified binary levels within which the circuit transistors are unable to accurately respond, was found to be relatively wide, on the order of 200 mv. for binary levels between ground and minus 400 mv. This characteristic of the network also required tight tolerances.

BRIEF SUMMARY OF THE INVENTION

It is an object of the present invention to provide a novel multiple level logic network of the type referred to which improves the network's performance and relaxes component and signal tolerances, while retaining the advantageous characteristics of high speed and low power.

It is a further object of the invention to improve the operational stability of the described multiple level logic network by substantially reducing any tendency for the reference transistors of the transistor logic gates to spuriously respond to applied narrow width clock signals.

It is a further object of the present invention to provide a novel multiple level network of the type described wherein the hysteresis of threshold for the transistor components of the logic gate is appreciably reduced.

These and other objects of the invention are accomplished by employing a digital logic network for performing a two-level logic operation with memory, which basically includes: a single input bistable memory means, typically a tunnel diode circuit; a first logic means, typically a clock source, for generating a constant signal in the form of periodic narrow width pulses having steep leading and lagging edges; a second logic means for generating a variable signal in the form of a pulse or absence of a pulse in response to the application of digital input information and said constant signal, said second logic means being typically a logic gate circuit including at least one reference transistor to which the constant signal pulses are applied, and at least one input transistor connected in a current steering relationship with said reference transistor for biasing said reference transistor as a function of said digital input information, said reference transistor conducting to generate the variable signal pulses or being inhibited from conducting in accordance with said input information. There is further provided means for coupling said variable signals pulses to the tunnel diode for driving it into a first stable state and means for coupling said constant signal pulses to said tunnel diode approximately concurrent with the coupling of said constant signal pulses to said reference transistor for driving said tunnel diode into a second stable state in the absence of said variable signal pulses, said variable signal pulses taking precedence over said constant signal pulses when both are present for driving said tunnel diode into said first stable state.

In accordance with the present invention, there is provided means for coupling said constant signal pulses to said reference transistor which provides shaping of said constant signal pulses so as to avoid spurious operation of said reference transistor and a reduction in the hysteresis of the threshold voltage levels, including a further transistor having a base, emitter and collector, the output of said first logic means being connected to said base, said emitter being connected through a series resistor to the shunt connection of a bias resistor and a capacitor, and the junction of said series resistor and capacitor being connected to the input of said reference transistor, whereby said capacitor is charged through said series resistor upon the application of said constant signal pulses to said base and said capacitor is discharged through said bias resistor upon termination of said constant signal pulses.

DETAILED DESCRIPTION OF THE DRAWING

Figure 1:
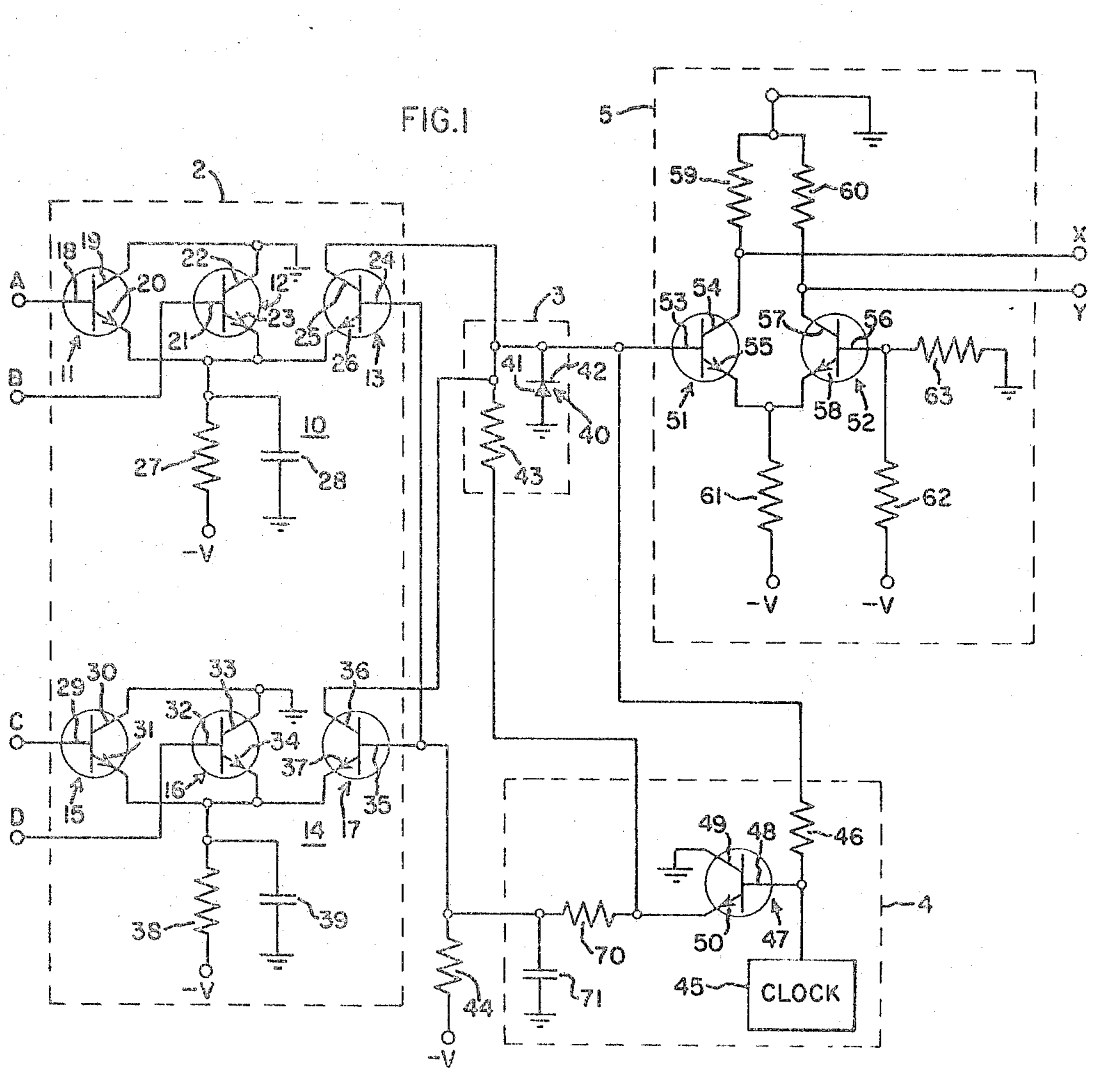
Figure 2:
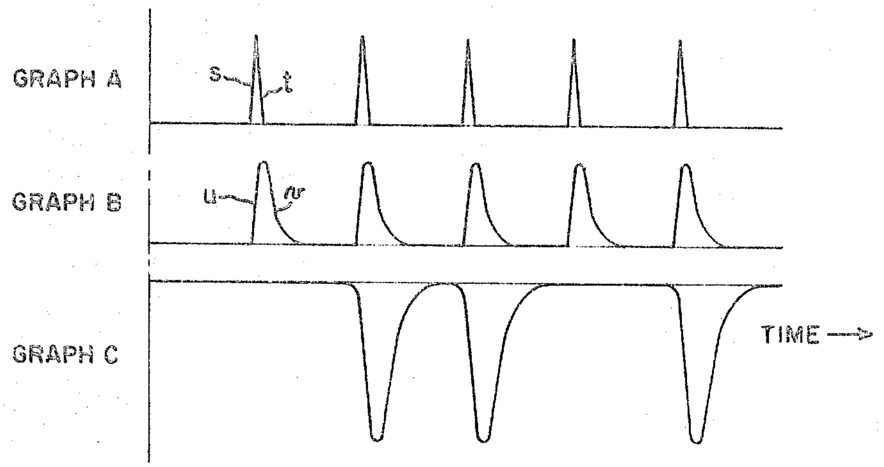

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

FIG. 1 is a schematic circuit diagram of a multiple level logic network in accordance with the invention; and FIG. 2 is a series of graphs of several signal pulses generated by the circuit of FIG. 1.

Referring to FIG. 1, there is illustrated a schematic circuit diagram of a high-speed memory and multiple level logic network in accordance with the invention, capable of deriving a number of two-level logic functions at speeds up to and beyond several hundred MHz., and with low-power requirements, in the order of a few milliwatts. The illustrated network represents a basic building block from which numerous logic systems can be derived for performing various complex logic functions. The network includes as principal components a logic gate circuit 2, a tunnel diode circuit 3, a clock generator circuit 4 and an output circuit 5. The logic gate circuit 2 performs various basic boolean logic operations, typically AND/OR logic operations. The circuit 2 also acts to provide isolation between the tunnel diode and the input terminals of the network, shown as terminals A,B,C and D. A pair of output terminals X and Y provide complementary outputs from the output circuit 5. A first output from clock generator circuit 4 applies to the tunnel diode circuit 3 a constant signal in the form of periodic clock pulses of a given polarity, each pulse by itself being capable of switching the tunnel diode to one of its voltage states, typically the low-voltage state. These pulses are narrow width pulses having sharp leading and lagging edges, as illustrated in Graph A of FIG. 2. A second putout from the clock generator circuit 4 supplies reference pulses to the logic gate circuit 2, which in response thereto applies to the tunnel diode circuit 3 a variable signal in the form of a pulse or absence of a pulse as a function of the binary logic inputs applied to the network. The reference pulses, illustrated in Graph B of FIG. 2, are shaped to provide improved circuit performance. This will be described in greater detail presently, The pulses applied to the tunnel diode from circuit 2, for a given input condition being shown in Graph C of FIG. 2, are of opposite polarity to the applied clock pulses and approximately twice the magnitude for driving the tunnel diode to its high-voltage state. When present they override the clock pulses and are determinative of the state in which the tunnel diode is driven. The output circuit 5 provides a complementary output voltage indicative of the tunnel diode state, and as well provides isolation between the tunnel diode and the output terminals X and Y.

The logic gate circuit 2 performs a current mode transistor logic. Although not shown specifically, it should be understood that at typical operating speeds a distributed transmission system is utilized. The logic gate circuit 2 includes a first logic gate 10 comprising a pair of emitter coupled input transistors 11 and 12 and a reference transistor 13, and a second logic gate 14 comprising a further pair of emitter coupled input transistors 15 and 16 and reference transistor 17. In each logic gate, an approximately fixed current is conducted either by one or both of the input transistors or by the reference transistor as a function of the binary input signals applied to the input transistors in combination with the reference signal applied to the reference transistor.

Transistor 11 has a base 18, a collector 19 and an emitter 20; transistor 12 has a base 21, a collector 22 and an emitter 23; and transistor 13 has a base 24, a collector 25 and an emitter 26. Input terminal a is connected to base 18, and input terminal B is connected to base 21. Collectors 19 and 22 are commonly connected to ground. Emitters 20, 23 and 26 are joined together and connected through a common emitter resistor 27 to a source of potential −V. Connected across resistor 27 to ground is a capacitor 28 which acts to provide a surge of current flow through transistor 13 for driving the tunnel diode.

Transistor 15 has a base 29, a collector 30 and an emitter 31; transistor 16 has a base 32, a collector 33 and an emitter 34; and transistor 17 has a base 35, a collector 36 and an emitter 37. Input terminal C is connected to base 29 and input terminal D is connected to base 32. Collectors 30 and 33 are commonly connected to ground. Emitters 31, 34 and 37 are joined together and connected through an emitter resistor 38 to source −V. A capacitor 39 is connected across resistor 38 to ground and functions similarly to capacitor 28.

The tunnel diode circuit 3 includes a tunnel diode device 40 having an anode 41 connected to ground and a cathode 42 connected to a load resistor 43. The clock generator circuit 4 includes a base 48, a collector 49 and an emitter 50. A resistor 70 is connected to the emitter 50 and in a series therewith a capacitor 71. The output from clock source 45 is connected through resistor 46 to cathode 42 of tunnel diode 40 for coupling the clock pulses to the tunnel diode. The output from source 45 is further connected to the base 48 of transistor 47. Collector 49 is connected to ground and emitter 50 is connected through the serial arrangement of resistor 70 and capacitor 71 to ground. Cathode 42 of tunnel diode 40 is connected through load resistor 43 to emitter 50. A further load resistor 44 is connected between the junction of resistor 70 and capacitor 71 to source −V. The junction of resistor 70 and capacitor 71 is further connected to the base electrodes 24 and 35 of reference transistors 13 and 17 for supplying the reference pulses. The RC connections of capacitor 71 with resistors 70 and 44 provides pulse shaping of the leading and lagging edges of the reference pulses which is found to avoid spurious operation of the reference transistors 13 and 17, and to improve the hysteresis of threshold voltage levels of the network.

Output circuit 5 includes a pair of emitter-connected output transistors 51 and 52 which operate in a current steering mode. Transistor 51 has a base 53, collector 54 and emitter 55. Transistor 52 has a base 56, a collector 57 and an emitter 58. Collector 54 is connected through a biasing resistor 59 to ground, and collector 57 is connected through a biasing resistor 60 to ground. Emitters 55 and 58 are joined together and connected through an emitter resistor 61 to source −V. The cathode 42 of tunnel diode 40 is connected to the base 53. Base 56 is connected to the junction of biasing resistors 62 and 63, which resistors are serially connected between the source −V and ground and provide a potential division. Output terminal X is connected to collector 54, and output terminal Y is connected to collector 57 to provide a pair of complementary output voltage levels of uniform magnitude.

In one exemplary operable embodiment of the described network, the following circuit components and parameters were used, being presented for purposes of illustration and not to be construed as limiting.

| | | |
|---|---|---|
| Capacitors 28 and 39 | | 36 picofarads |
| Capacitor 71 | | 10 picofarads |
| Resistors 27 and 38 | | 1.2 kilohms |
| Resistor 43 | | 750 ohms |
| Reistor 44 | | 1.6 kilohms |
| Resistor 46 | | 1.5 kilohms |
| Resistor 59 | | 175 ohms |
| Resistor 60 | | 200 ohms |
| Resistor 61 | | 470 ohms |
| Resistor 62 | | 3.3 kilohms |
| Resistor 63 | | 300 ohms |
| Resistor 70 | | 50 ohms |
| Transistors 11, 12, 13, 15, 16, 17, 47, 51 and 52 | | Type 2N918 |
| Tunnel Diode 40 | | Type 1N3713 |
| Voltage Source −V | = | 2.0 volts |

The network of FIG. 1 can perform a double OR-AND function, a double AND-OR function, or numerous variations that can be made of such logic functions, e.g., binary half-adding. Further, although illustrated as having two transistor logic gates with two static inputs per gate, the network can be readily expanded to include additional logic gates, as well as additional input transistors per gate, for extending the logic operation performed.

For purposes of explanation, a typical operation will be considered in which a double OR-AND function is generated. In the generation of a digital, static-type logic, a pair of discrete voltage levels are employed for the representation of a binary "1" and a binary "0."In the design of the circuit under consideration, these voltages have about a 400 mv. separation, with the higher voltage level being at ground. For illustration, a higher voltage level may be said to correspond to a binary "1" and the lower voltage level to a binary "0." Once the design of the circuit is fixed for the indicated voltage levels, or whatever levels are employed, it is important that these levels be established at both output terminals of the network so as to be available as inputs to other interconnected networks.

In a first logic sequence, it is assumed that a binary "1" is applied to input terminal A and a "0" is applied to input terminal B. Typically, these voltages are ground and minus 400 mv., respectively. Transistor 11 is then conducting and transistor 12 is nonconducting so that all the current is steered through transistor 11. The emitter voltage level is at several hundred mv. below that of the conducting transistor base voltage, in this case the input to terminal A. For the operation being considered, the emitter voltage is typically minus 750 mv. Binary "1" and "0" inputs are also applied to input terminals C and D, respectively, so that the current in the second logic gate 14 is steered through transistor 15 with the voltage levels comparable to those of logic gate 10.

The tunnel diode provides storage with respect to the previous logic sequence. The tunnel diode is assumed to be in its low-voltage state so that the base 53 of output transistor 51 is sufficiently positive with respect to the fixed base applied to base 56 that transistor 51 conducts and transistor 52 is cut off. Thus, there is storage of a "0" output from terminal X and a "1" output from terminal Y.

The tunnel diode is loaded by the resistor 43, with the bias voltage established essentially at the emitter 50 to provide a bistable operation of the diode. When considering the bistable operation of the tunnel diode, it is significant that there be a large enough differential in the forward voltage drop for high- and low-voltage conditions to support signal swings at the output which are adequate for distinguishing information bits. In the present case, the specific requirement is to control the conduction of transistors 51 and 52 so as to steer current through one or the other as a function of the tunnel diode operating state. In addition, the forward voltage drop in the high-voltage state should be small enough so as to prevent the reference transistors of the logic gate circuit from saturating during conduction. In the exemplary operation under consideration, the differential in forward voltage drop should be at least 400 mv., with the high-voltage drop being no greater than about 600 mv.

At the end of the first logic sequence a clock pulse is generated for performing the indicated double OR-AND logic function with respect to the inputs existing at this time. As already noted, the clock pulses are of narrow width with steep leading and lagging edges, shown by slopes $s$ and $t$ in Graph A of FIG. 2. In the example being considered, the pulses are about 5 nanoseconds wide with a rise and fall time of about 1 to 2 nanoseconds. The magnitude is about 600 mv. During the clock standby periods, the voltage level of the output from clock source 45 is at approximately ground. In response to the clock pulse being applied to the transistor 47, the transistor conducts and during application of the leading edge of said pulse capacitor 71 charges through resistor 70 from a highly negative voltage to a voltage slightly below ground. This voltage rise forms the leading edge of the reference pulse applied to the base electrodes 24 and 35 of reference transistors 13 and 17. As shown by the slope $u$ of the pulse in Graph B of FIG. 2, the rise time of the leading edge of the reference pulse is slightly greater, by a fraction of a nanosecond, than that of the clock pulse of source 45. For the operation being considered the voltages at the base electrodes 24 and 35 are typically at about minus 750 mv. during clock standby and rise to about minus 150 mv. in response to application of the clock pulse. Since at this time input terminals A and B have "1's," or ground potential, applied thereto, reference transistors 13 and 17 are prevented from conducting. Tunnel diode 40 has only the clock pulse applied and is driven further into its low-voltage state.

It is noted that the clock pulse to the transistor 47 is very abruptly terminated, due to its steep lagging edge. However, the voltage at the base electrodes 24 and 35 is prevented from the following this rapid voltage decline, but rather follows the discharge of the capacitor 71 through the resistor 44. This discharge forms the lagging edge of the reference pulse, shown by slope $v$ of the pulse in Graph B of FIG. 2. The fall time of the slope $v$ is substantially greater, on the order of several nanoseconds, than that of the applied clock pulse. Since the voltage at the base electrodes 24 and 35 is not permitted to change abruptly, there is avoided any spurious conduction of the reference transistors 13 and 17 through the collector base capacitances sufficient to switch the tunnel diode 40 into its high-voltage state.

In a second logic sequence, it is assumed that the input to terminal A goes to "0." For this input condition, input transistors 11 and 12 are both partially conducting and the current flowing in the circuit is therefore shared by the transistors. The emitter voltage level of logic gate 10 decays exponentially to a more negative voltage level. The decay is caused primarily by the charging of capacitor 28 to source −V, and the decay time is thereby a function of the RC time constant of the circuit, in particular, the values of resistor 27 and capacitor 28. It is necessary that the period between clock pulses be at least one and preferably two or three RC time constants so that the emitter voltage level is properly established.

It is noted that during the first and second logic sequences, the inputs to terminals C and D are presumed to not change and the emitter voltage level for logic gate 14 remains constant.

In response to the clock pulse at the end of the second logic sequence, the voltages at base electrodes 24 and 35 of the reference transistors are again raised. Because the voltage at base 24 becomes sufficiently higher than the voltage at the base electrodes of the input transistors 11 and 12, transistor 13 assumes the conduction mode and both transistors 11 and 12 become nonconducting. In response to the current conduction occurring through transistor 13, which applies a pulse as shown in Graph C of FIG. 2, the tunnel diode 40 switches to its high-voltage state. At about the same time, the output at terminal X switches to a "1" voltage level and the output at terminal Y switches to a "0" voltage level due to the output transistor 51 being turned off and output transistor 52 becoming conducting. It is noted that the pulses in Graph C are delayed somewhat with respect to corresponding pulses in Graph A, contributing to the improvement found in the hysteresis of the threshold.

The contributing improvement in the hysteresis of threshold may be explained as follows: The introduced delay applies the clock pulse slightly in advance of the reference transistor pulses when the latter are present and therefore acts to reset the tunnel diode to its low-voltage state for each application of the reference transistor pulses, whether the tunnel diode was previously in its high- or low-voltage state. Accordingly, the reference transistor pulses, which are a function of the inputs to the network, always operate to switch the tunnel diode from the low-voltage state to the high-voltage state. The introduced delay is so small that the instantaneous resetting to the low-voltage state when the tunnel diode is previously in its high-voltage state prior to application of the reference transistor pulses does not produce a spurious response in the network output. In the exemplary embodiment of the invention under consideration the hysteresis of the threshold is reduced significantly from about 200 mv. to about 20 mv., which permits an appreciable relaxation in component tolerances.

The conduction through the tunnel diode charges the capacitor 28 and the emitter voltage abruptly rises to a less negative potential. The connection of the shunt capacitor 28 reduces the signal current required for switching the tunnel diode and thereby provides a power savings since a source of current for switching the tunnel diode is permitted to flow only long enough for the capacitor to be charged. Since the capacitor is of small value the time for charging it is short. The capacitor 28 is of further value in that it helps to prevent a race condition from developing by introducing a small delay into the circuit. Once the tunnel diode is switched and the capacitor is charged, current limiting is provided by the emitter resistor 27. Upon termination of the clock pulse, reference transistor 13 again becomes nonconducting and the current is steered back to be shared by transistors 11 and 12. The emitter voltage is returned to its more negative potential by the discharging of capacitor 28.

It is noted that shaping of the leading edge of the reference pulse by means of the capacitor 71 and resistor 70, in addition to avoiding spurious operation of the reference transistors, as previously indicated, is also found to increase the collector current available to the reference transistors 13 and 17 during their conduction. This is so because the reference transistors are inverting current gain devices driven by a unity gain driver device, transistor 47.

What we claim as new and desire to secured by Letters Patent of the United States is:

1. A multiple level logic network, comprising:

a. a single input bistable memory means, b. first logic means for generating a constant signal in the form of periodic narrow width pulses having steep leading and lagging edges, c. second logic means for generating a variable signal in the form of a pulse or absence of a pulse as a function of applied digital input information, said second logic means including at least one reference transistor and at least one input transistor to which said input information is applied, d. first means for coupling with a small delay the constant signal pulses to said reference transistor, whereby said reference transistor is caused to conduct or is inhibited from conducting in accordance with a given bias established by said input transistor, e. a second means for coupling said variable signal pulses to the input of said memory means for driving it into a first stable state, and f. third means for coupling said constant signal pulses to the input of said memory means approximately concurrent with and slightly in advance of the coupling of said constant signal pulse to said reference transistor, for driving said memory means into a second stable state in the absence of said variable signal, said variable signal pulses taking precedence over said constant signal pulses when both are present at the memory means input for driving said memory means into the first stable state, and said first means providing a reduction in the hysteresis of threshold of the network.

2. A multiple level logic network as in claim 1 wherein said first means includes the shunt connection of a bias resistor and a capacitor for shaping said constant signal pulses so as to avoid spurious operation of said reference transistor.

3. A multiple level logic network as in claim 2 wherein said first means further includes a further transistor having a base, emitter and collector, said first logic means being coupled to said base, said emitter being connected through a series resistor to the shunt connection of said bias resistor and capacitor, and the junction of said series resistor, bias resistor and capacitor being connected to the input of said reference transistor.

4. A multiple level logic network as in claim 3 wherein said constant signal pulses are of a given polarity and magnitude and said variable signal pulses are of a polarity opposite to said given polarity and a magnitude substantially greater than said given magnitude.

5. A multiple level logic network as in claim 1 wherein said memory means includes a tunnel diode device.